United States Patent
Moorthy et al.

(10) Patent No.: US 12,483,942 B2
(45) Date of Patent: Nov. 25, 2025

(54) CONNECTED CALL RECOVERY

(71) Applicant: QUALCOMM Incorporated, San Diego, CA (US)

(72) Inventors: Rakesh Krishna Moorthy, Bangalore (IN); Vinaya Kumara T.V., Bengaluru (IN); Sarat Chandra Battini, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 17/871,703

(22) Filed: Jul. 22, 2022

(65) Prior Publication Data

US 2024/0031883 A1    Jan. 25, 2024

(51) Int. Cl.
| | |
|---|---|
| *H04W 4/00* | (2018.01) |
| *H04L 65/1016* | (2022.01) |
| *H04L 65/1073* | (2022.01) |
| *H04W 36/00* | (2009.01) |
| *H04W 76/30* | (2018.01) |
| *H04W 84/12* | (2009.01) |

(52) U.S. Cl.
CPC ..... *H04W 36/0061* (2013.01); *H04L 65/1016* (2013.01); *H04L 65/1073* (2013.01); *H04W 76/30* (2018.02); *H04W 84/12* (2013.01)

(58) Field of Classification Search
CPC .. H04W 36/00; H04W 76/30; H04L 65/1016; H04L 65/1073
See application file for complete search history.

(56) References Cited

U.S. PATENT DOCUMENTS

| | | | | |
|---|---|---|---|---|
| 7,184,418 | B1* | 2/2007 | Baba | H04W 8/12 |
| | | | | 370/902 |
| 8,359,024 | B1* | 1/2013 | Singh | H04W 76/19 |
| | | | | 455/67.11 |
| 10,542,137 | B1* | 1/2020 | Sial | H04M 1/571 |
| 2009/0177785 | A1* | 7/2009 | Reid | H04L 61/00 |
| | | | | 709/228 |
| 2014/0376511 | A1 | 12/2014 | Kalapatapu et al. | |
| 2015/0223128 | A1 | 8/2015 | Liu et al. | |
| 2017/0289201 | A1* | 10/2017 | Mendiratta | H04L 69/40 |

(Continued)

FOREIGN PATENT DOCUMENTS

WO     2004077745 A2    9/2004

OTHER PUBLICATIONS

Boysen et al., Proactive Handover in Heterogenous Networks using SIPs, 2008, IEEE, pp. 719-724. (Year: 2008).*

(Continued)

*Primary Examiner* — Elisabeth Benoit Magloire
(74) *Attorney, Agent, or Firm* — Seyfarth Shaw LLP

(57) ABSTRACT

A method of wireless communication includes initiating handover of a first call from a source network to a target network. The first call is associated with first header information. The method also includes receiving a message indicating a change of Internet protocol (IP) address to a new IP address during the handover. The method further includes releasing resources associated with the first call, in response to receiving the message. The method includes registering the new IP address with the target network, and initiating a second call with the first header information. The method also includes replacing the first call with the second call and the new IP address.

24 Claims, 7 Drawing Sheets

(56) References Cited

U.S. PATENT DOCUMENTS

| | | | |
|---|---|---|---|
| 2018/0206166 A1* | 7/2018 | Ganesan | H04W 36/0011 |
| 2018/0337862 A1* | 11/2018 | Sharma | H04L 43/087 |
| 2019/0098536 A1* | 3/2019 | Qiao | H04W 36/0016 |
| 2019/0098537 A1* | 3/2019 | Qiao | H04W 36/0033 |
| 2019/0174003 A1* | 6/2019 | Chandramouli | H04W 48/20 |
| 2019/0245895 A1* | 8/2019 | Balasaygun | H04L 65/1104 |
| 2020/0205044 A1* | 6/2020 | Lin | H04W 76/12 |
| 2021/0037586 A1* | 2/2021 | Foti | H04L 69/40 |
| 2021/0105691 A1 | 4/2021 | Zhu et al. | |
| 2022/0232053 A1* | 7/2022 | Grover | H04L 65/1086 |
| 2022/0330380 A1* | 10/2022 | Haislip | H04W 80/10 |
| 2022/0337637 A1* | 10/2022 | Huang | H04L 67/141 |

OTHER PUBLICATIONS

Salsano et al., Seamless vertical handover of VoIP calls based on SIP Session Border Controllers, 2006, IEEE, pp. 2040-2047. (Year: 2006).*

International Search Report and Written Opinion—PCT/US2023/026720—ISA/EPO—Oct. 18, 2023.

\* cited by examiner

-- PRIOR ART --

CONNECTED CALL RECOVERY

FIELD OF THE DISCLOSURE

The present disclosure relates generally to wireless communications, and more specifically to connected call recovery during handover from one wireless network to another.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication includes initiating handover of a first call from a source network to a target network. The first call is associated with first header information. The method also includes receiving a message indicating a change of Internet protocol (IP) address to a new IP address during the handover. The method further includes releasing resources associated with the first call, in response to receiving the message. The method includes registering the new IP address with the target network, and initiating a second call with the first header information. The method also includes replacing the first call with the second call and the new IP address.

In aspects of the present disclosure, a method of wireless communication by a network entity includes receiving a request to handover a first call from a source network to a target network. The first call is associated with first header information. The method also includes transmitting a message indicating a change of Internet protocol (IP) address to a new IP address during the handover. The method further includes releasing resources associated with the first call. The method includes registering the new IP address, and receiving signaling to initiate a second call with the first header information. The method also includes replacing the first call with the second call and the new IP address.

Other aspects of the present disclosure are directed to an apparatus. The apparatus has a memory and one or more processors coupled to the memory. The processor(s) is configured to initiate handover of a first call from a source network to a target network. The first call is associated with first header information. The processor(s) is also configured to receive a message indicating a change of Internet protocol (IP) address to a new IP address during the handover. The processor(s) is further configured to release resources associated with the first call, in response to receiving the message. The processor(s) is configured to register the new IP address with the target network, and to initiate a second call with the first header information. The processor(s) is also configured to replace the first call with the second call and the new IP address.

Other aspects of the present disclosure are directed to an apparatus. The apparatus has a memory and one or more processors coupled to the memory. The processor(s) is configured to receive a request to handover a first call from a source network to a target network. The first call is associated with first header information. The processor(s) is also configured to transmit a message indicating a change of Internet protocol (IP) address to a new IP address during the handover. The processor(s) is further configured to release resources associated with the first call. The processor(s) is configured to register the new IP address, and to receive signaling to initiate a second call with the first header information. The processor(s) is also configured to replace the first call with the second call and the new IP address.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
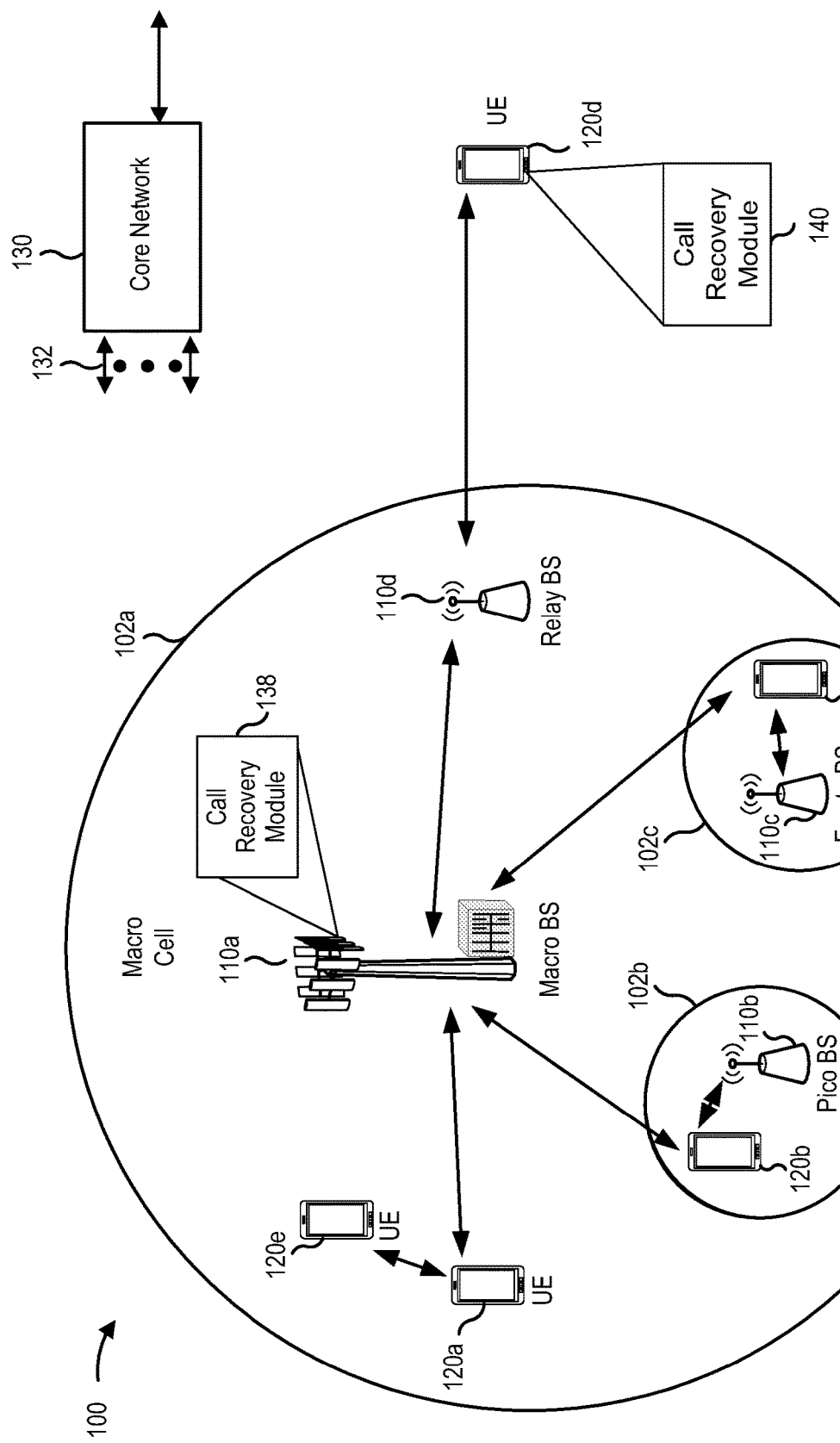
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In existing technologies for mobile communications, such as with telematics, a user equipment (UE) ends a call when an Internet protocol (IP) address assigned to the UE changes during a handover to another network. Such a handoff may be part of an evolved packet data gateway (EPDG) handoff from a fifth generation (5G) new radio (NR) network to an IP multimedia subsystem (IMS) network, such as a wireless local area network (WLAN) (e.g., 802.11 WiFi), and vice versa. These handoff procedures have many indoor use cases, for example, where a cellular signal does not reach all parts of a building that has good WiFi coverage, the UE hands off from the cellular network to the WiFi network. The handoff may occur when cellular network connectivity is lost, for example, due to poor cell conditions in an area with strong WiFi coverage. Handoff interruption due to IP address change negatively impacts a user experience because such handoffs happen implicitly without user intervention, resulting in dropped calls for reasons unknown to the user.

According to aspects of the present disclosure, a process is introduced in which a UE experiencing network impairment releases a call connected to a remote UE. The new process then recovers the call by setting up a new call to replace the dropped/released call. The new call is set up with a fresh Invite message to the remote UE. The new Invite message includes replacement header information.

Aspects of the present disclosure are beneficial when a UE is registered with an NR or long term evolution (LTE) network and also connected to a WLAN access point (AP). In this example, the user places a voice call over the NR network and the call is connected to a called party. During the call, when the call is handed over to WLAN due to handoff criteria, the network reports an IP address change event as part of the handoff procedure. The call will be dropped immediately as the call has been established with a different IP address and the remote UE cannot be updated with the new IP address without completing a registration procedure with the new IP address.

To address these issues, aspects of the present disclosure locally clean up the call. That is, the calling UE releases resources associated with the call. In some implementations, a custom reason may be provided to a user interface (UI) to notify the user that the call is in a reconnecting state due to network impairment. The calling UE also stores certain header information associated with the first call, and registers a new IP address with the network. Once the registration is complete, the calling UE sends an invite to the remote UE substituting certain header information associated with the original call, as part of a replacement header, enabling the remote UE to recover the previous call.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a call recovery module 140. For brevity, only one UE 120d is shown as including the call recovery module 140. The call recovery module 140 may initiate handover of a first call from a source network to a target network. The first call is associated with first header information. The call recovery module 140 may also receive a message indicating a change of Internet protocol (IP) address to a new IP address during the handover. The call recovery module 140 may further release resources associated with the first call, in response to receiving the message, and register the new IP address with the target network. The call recovery module 140 may also initiate a second call with the first header information. The call recovery module 140 may also replace the first call with the second call and the new IP address.

The core network 130, the base stations 110, components of the base station 110, or another network device, such as a wireless local area network (WLAN) access point may include a call recovery module 138. For brevity, only one base station 110 is shown as including the call recovery module 138. The call recovery module 138 may receive a request to handover a first call from a source network to a target network, the first call associated with first header information. The call recovery module 138 may also transmit a message indicating a change of Internet protocol (IP) address to a new IP address during the handover. The call recovery module 138 may further release resources associated with the first call. The call recovery module 138 may also register the new IP address, and receive signaling to initiate a second call with the first header information. The call recovery module 138 may also replace the first call with the second call and the new IP address.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
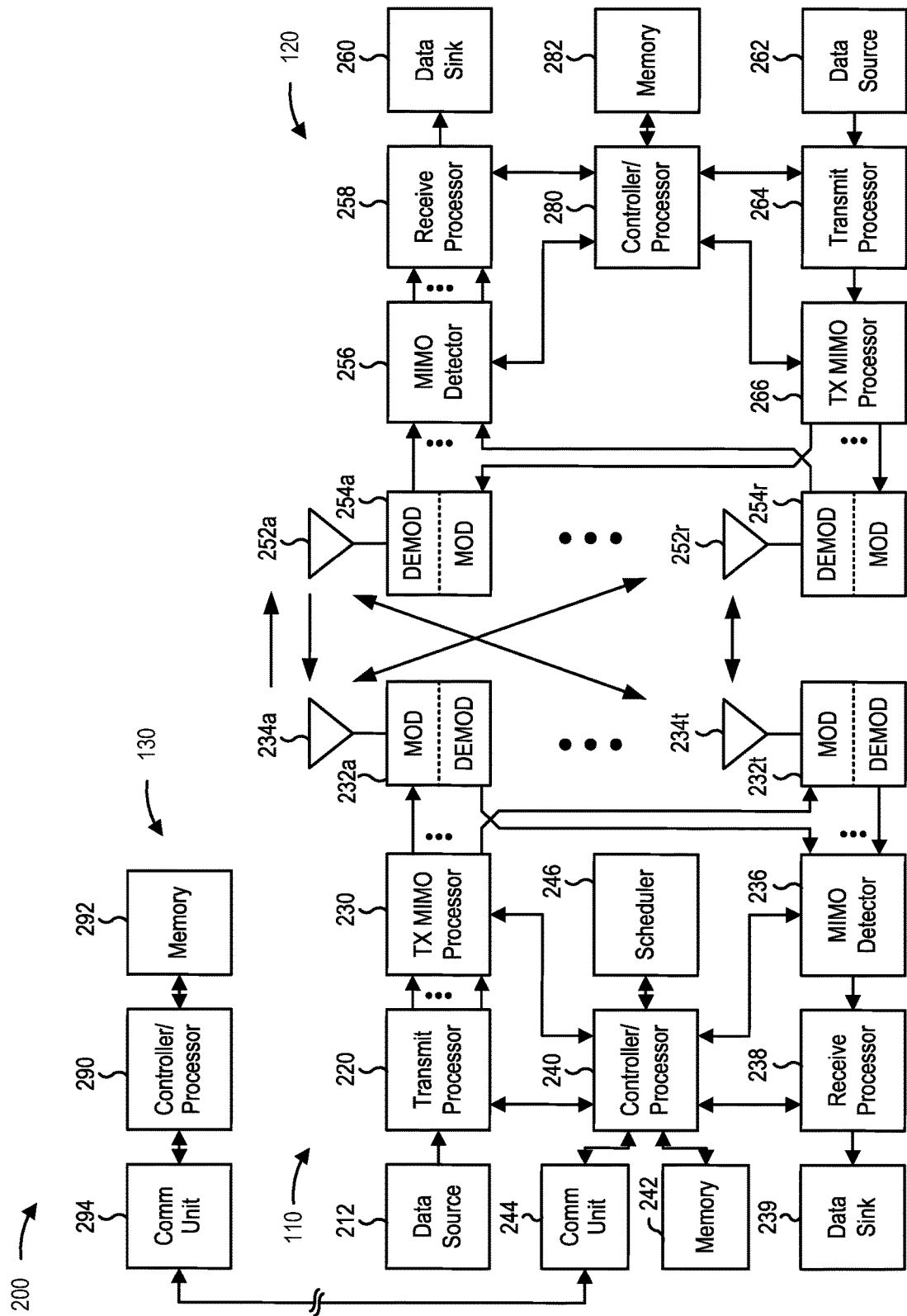
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with connected call recovery, as described in more detail elsewhere. For example, the controller/processor 240 of the base station 110, the controller/processor 280 of the UE 120, and/or any other component(s) of FIG. 2 may perform or direct operations of, for example, the processes of FIGS. 5-7 and/or other processes as described. Memories 242 and 282 may store data and program codes for the base station 110 and UE 120, respectively. A scheduler 246 may schedule UEs for data transmission on the downlink and/or uplink.

In some aspects, the UE 120, base station 110, component of a base station, or another network device may include means for initiating, means for receiving, means for releasing, means for registering, means for replacing, means for storing, means for generating, and/or means for transmitting. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
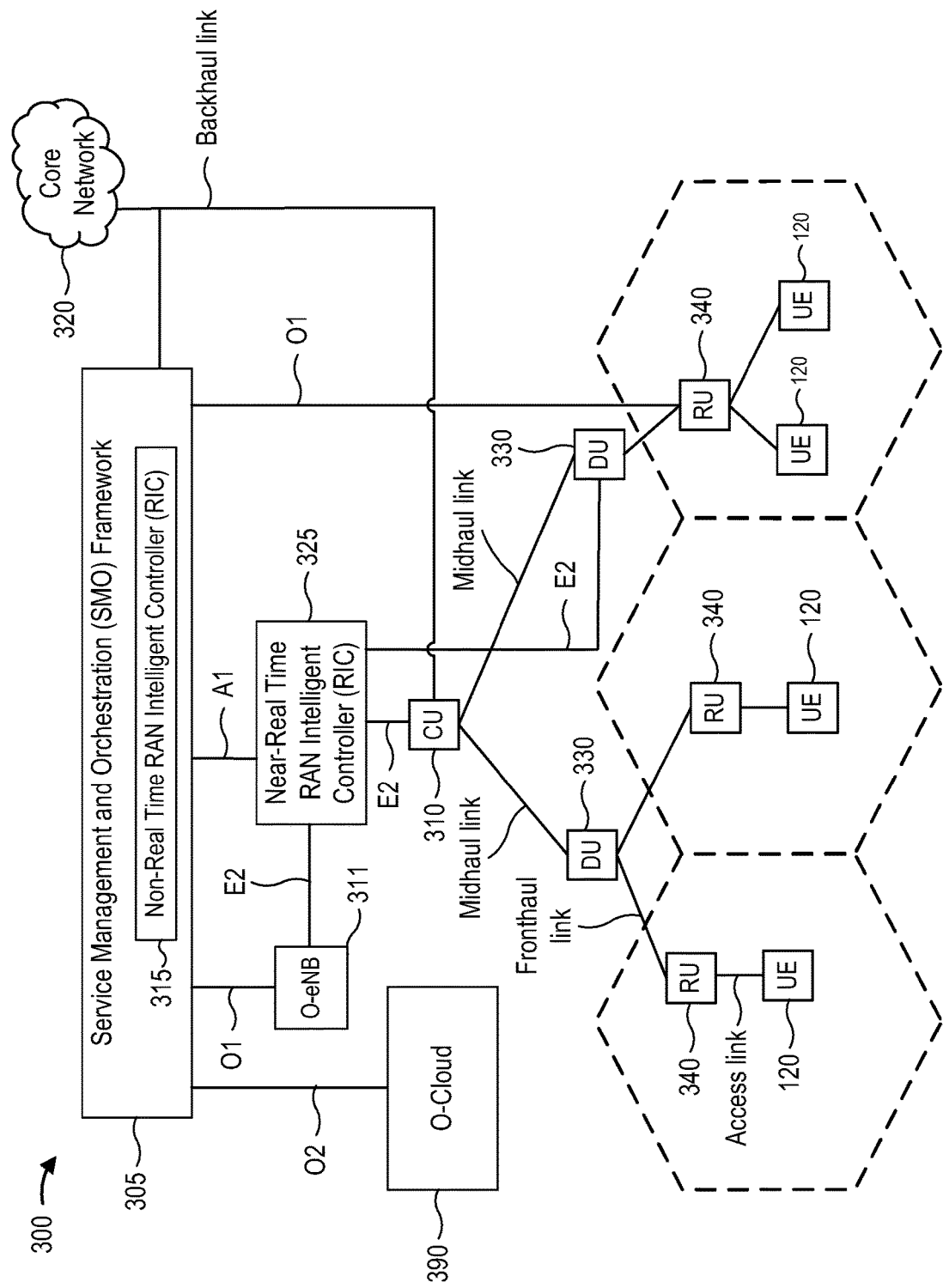
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit—user plane (CU-UP)), control plane functionality (e.g., central unit—control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

In existing technologies for mobile communications, such as with telematics, a user equipment (UE) ends a call when an Internet protocol (IP) address assigned to the UE changes during a handover to another network. Such a handoff may be part of an evolved packet data gateway (EPDG) handoff from a fifth generation (5G) new radio (NR) network to an IP multimedia subsystem (IMS) network, such as a wireless local area network (WLAN) (e.g., 802.11 WiFi), and vice versa. These handoff procedures have many indoor use cases, for example, where a cellular signal does not reach all parts of a building that has good WiFi coverage, the UE hands off from the cellular network to the WiFi network. The handoff may occur when cellular network connectivity is lost, for example, due to poor cell conditions in an area with strong WiFi coverage. Handoff interruption due to IP address change negatively impacts a user experience because such handoffs happen implicitly without user intervention, resulting in dropped calls for reasons unknown to the user.

According to aspects of the present disclosure, a process is introduced in which a UE experiencing network impairment releases a call connected to a remote UE. The new process then recovers the call by setting up a new call to replace the dropped/released call. The new call is set up with a fresh Invite message to the remote UE. The new Invite message includes replacement header information.

Aspects of the present disclosure are beneficial when a UE is registered with an NR or long term evolution (LTE) network and also connected to a WLAN access point (AP). In this example, the user places a voice call over the NR network and the call is connected to a called party. During the call, when the call is handed over to WLAN due to handoff criteria, the network reports an IP address change event as part of the handoff procedure. The call will be dropped immediately as the call has been established with a different IP address and the remote UE cannot be updated with the new IP address without completing a registration procedure with the new IP address.

To address these issues, aspects of the present disclosure locally clean up the call. That is, the calling UE releases resources associated with the call. In some implementations, a custom reason may be provided to a user interface (UI) to notify the user that the call is in a reconnecting state due to network impairment. The calling UE also stores certain header information associated with the first call, and registers a new IP address with the network. Once the registration is complete, the calling UE sends an invite to the remote UE substituting certain header information associated with the original call, as part of a replacement header, enabling the remote UE to recover the previous call.

Figure 4:
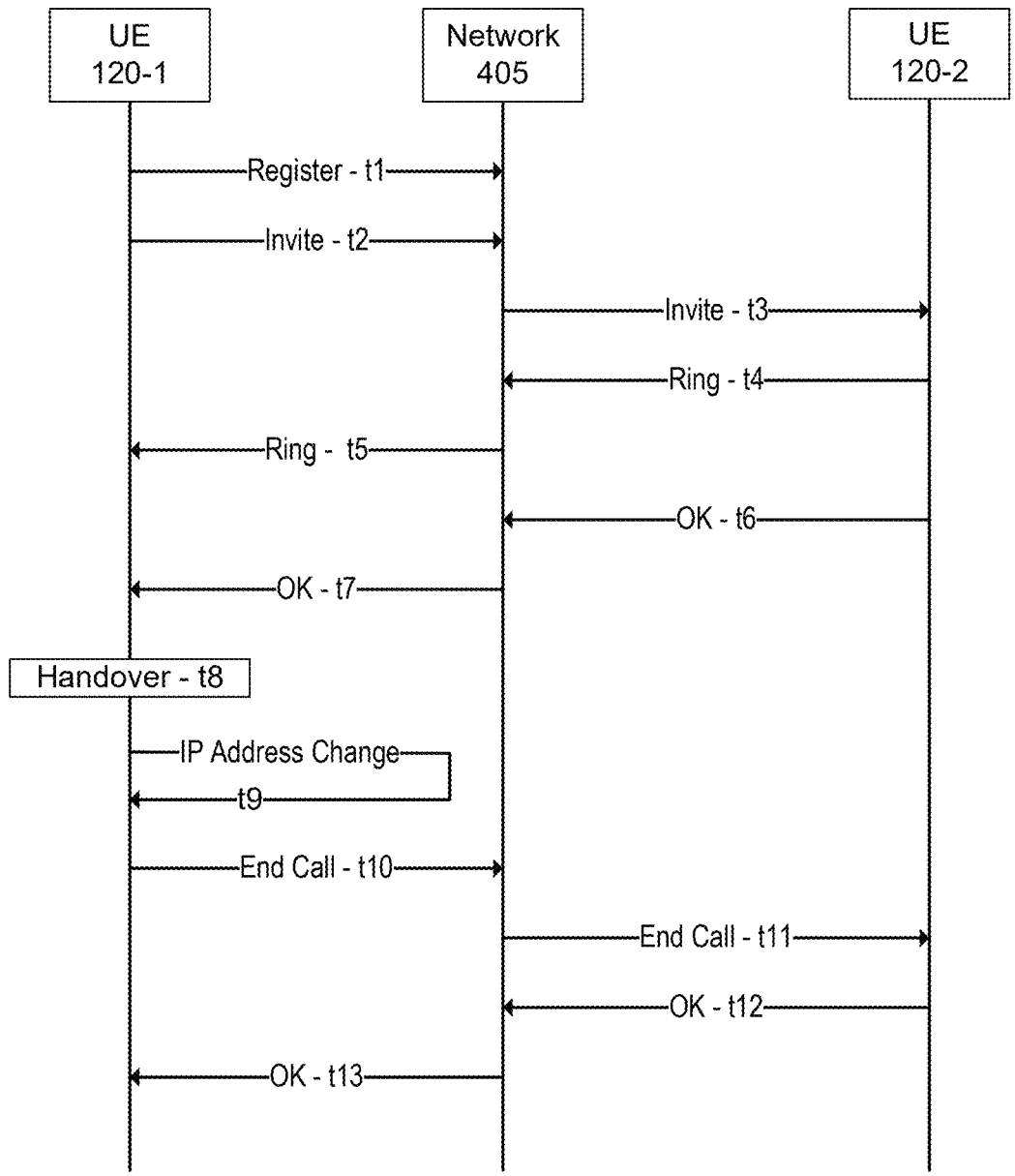
FIG. 4 is a timing diagram illustrating handover failure due to an Internet protocol (IP) address change.

FIG. 4 is a timing diagram illustrating handover failure due to an Internet protocol (IP) address change. In the example of FIG. 4, a calling UE 120-1 establishes a call with a called UE 120-2 via a network entity 405, such as a base station, a component of a base station (e.g., DU, CU, RU), or a WLAN (or WiFi) access point. At time t1, the calling UE 120-1 registers with the network 405. The registration may include registering with an NR network and also signing in with a WiFi access point, for example. At time t2, the calling UE 120-1 transmits an Invite message to the network 405. The Invite message may be a voice over NR message, for example. At time t3, the network 405 forwards the Invite message to the called UE 120-2. At time t4, the called UE 120-2 transmits a Ring message to the network 405, which forwards the Ring message to the calling UE 120-1 at time t5. At times t6 and t7, the called UE 120-2 and network 405 transmit an OK message to the calling UE 120-1, respectively, to indicate successful establishment of the call.

For some reason, at time t8, the calling UE 120-1 initiates a handover. Such reasons may include a measured signal strength falling below a threshold or loss of service, for example. During the handover process, at time t9, the calling UE 120-1 receives an IP address change message from a lower layer. The IP address change event may result from an EPDG handoff from 5G to WiFi. Due to the IP address change, at time t10, the calling UE 120-1 ends the call. The network 405 forwards the end call message to the called UE 120-2 at time tn. At times t12 and t13, an OK message confirming termination of the call passes from the called UE 120-2 to the network 405, and from the network 405 to the calling UE 120-1, respectively.

Figure 5:
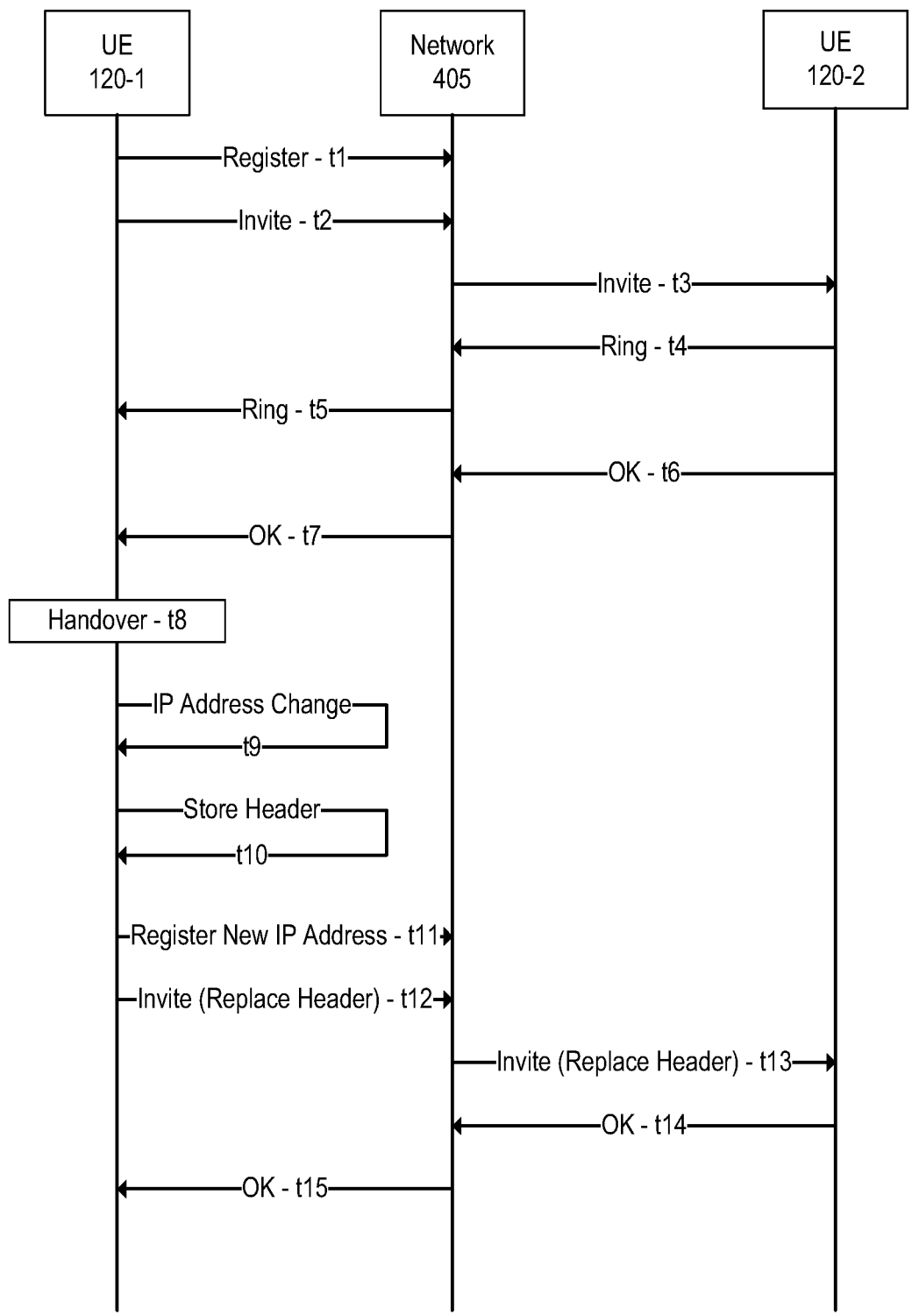
FIG. 5 is a timing diagram illustrating connected call recovery after an IP address change, in accordance with aspects of the present disclosure.

FIG. 5 is a timing diagram illustrating connected call recovery after an IP address change, in accordance with aspects of the present disclosure. In the example of FIG. 5, a calling UE 120-1 establishes a call with a called UE 120-2 via a network entity 405, such as a base station, a component of a base station (e.g., DU, CU, RU), or a WLAN (or WiFi) access point. At time t1, the calling UE 120-1 registers with the network 405. The registration may include registering with an NR network and also signing in with a WiFi access point, for example. At time t2, the calling UE 120-1 transmits an Invite message to the network 405. The Invite message may be a voice over NR message, for example. At time t3, the network 405 forwards the Invite message to the called UE 120-2. At time t4, the called UE 120-2 transmits a Ring message to the network 405, which forwards the Ring message to the calling UE 120-1 at time t5. At times t6 and t7, the called UE 120-2 and network 405 transmit an OK message to the calling UE 120-1, respectively, to indicate successful establishment of the call.

At time t8, the calling UE 120-1 initiates a handover. During the handover, at time t9, the calling UE 120-1 receives an IP address change message from a lower layer. Rather than ending the call due to the IP address change, at time t10, the calling UE 120-1 stores call header information associated with the call. More specifically, the calling UE 120-1 backs up information about the call (e.g., the call ID header), information about the calling party (e.g., 'from' header information), and information about the called party (e.g., 'to' header information). The calling UE 120-1 also cleans up the call. In other words, the calling UE 120-1 refreshes registration resources. In some aspects, the calling UE 120-1 generates a user interface message, informing the user that the calling UE 120-1 is attempting to reconnect the call.

At time t11, the calling UE 120-1 proceeds with registering the new IP address at the network 405, for example with the WiFi access point. Once the calling UE 120-1 is registered with the new address, the calling UE 120-1 establishes a new call at times t12 and t13. More specifically, the calling UE 120-1 replaces the header information with the header information of the previous call, such as the call ID, the 'to' tag, and the 'from' tag that were stored locally at time t10. The calling UE 120-1 sends an invite message with the replacement header to establish the new call. At time t14, the called UE 120-2 sends an OK message with the new session parameters. The network 405 forwards the OK message to the calling UE 120-1 at time t15 to recover the call with the new IP address. Thus, the previous call is replaced with the new call and recovered.

According to aspects of the present disclosure, calls may be recovered smoothly in case of a network impairment event, such as an IP address change due to handoff, packet data network down due to radio access technology (RAT) loss, etc. In these aspects, the UE recovers the call on the new network with the new IP address.

As indicated above, FIGS. 4-5 are provided as examples. Other examples may differ from what is described with respect to FIGS. 4-5.

Figure 6:
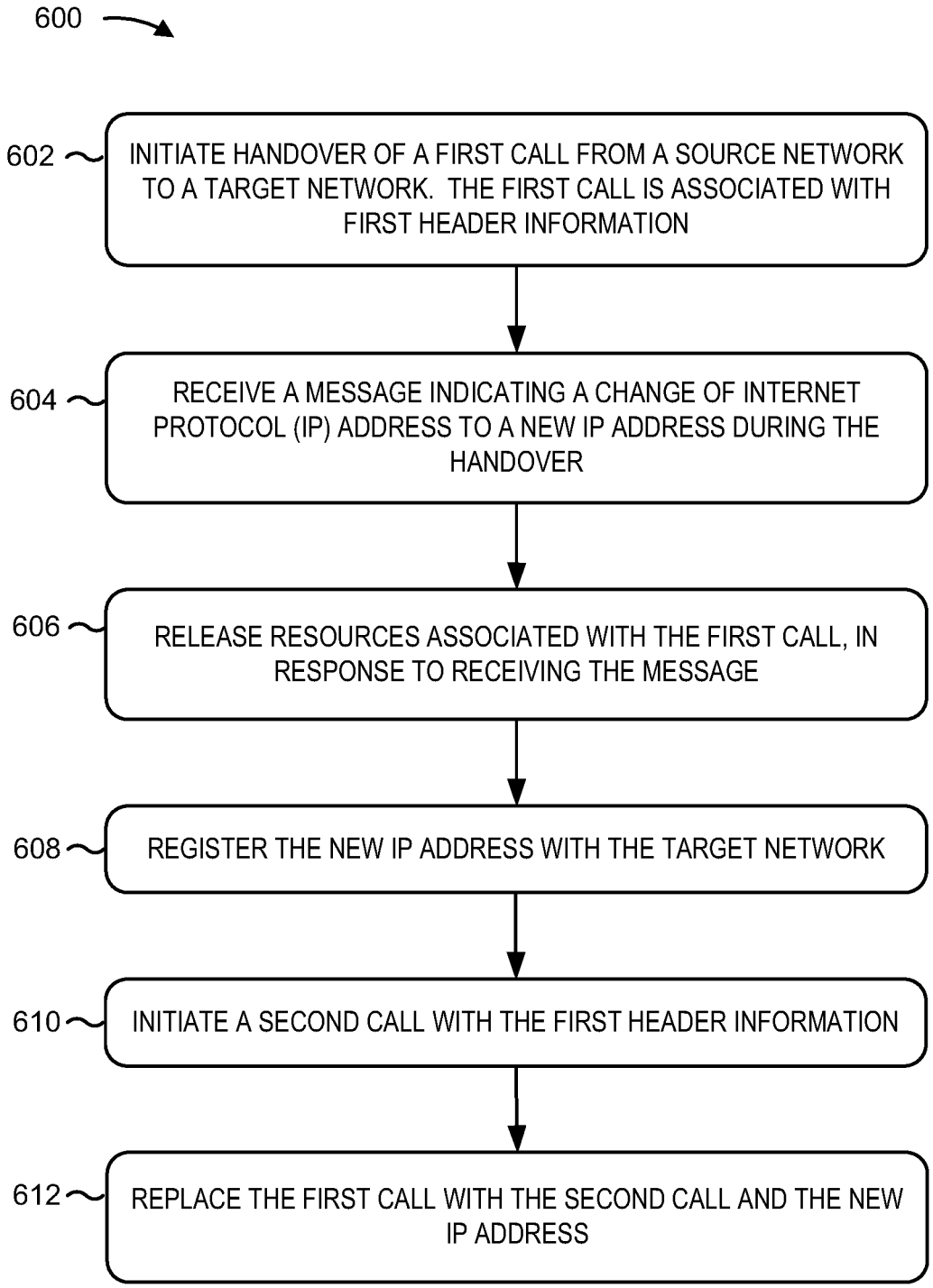
FIG. 6 is a flow diagram illustrating an example process performed, for example, by a user equipment (UE), in accordance with various aspects of the present disclosure.

FIG. 6 is a flow diagram illustrating an example process 600 performed, for example, by a user equipment (UE), in accordance with various aspects of the present disclosure. The example process 600 is an example of connected call recovery during handover from one wireless network to another. The operations of the process 600 may be implemented by a UE 120.

At block 602, the user equipment (UE) initiates handover of a first call from a source network to a target network. The first call is associated with first header information. For example, the UE (e.g., using controller/processor 280, memory 282, and/or the like) may initiate handover of the first call. In some aspects, the target network is an IP multimedia subsystem (IMS) network. The first header information may be a call identification (ID), information about a calling party, and information about a called party. In some aspects, the source network is a cellular network and the target network is a wireless local area network (WLAN). The cellular network may be a fifth generation (5G) new radio (NR) or a fourth generation (4G) long term evolution (LTE) network, for example.

At block 604, the user equipment (UE) receives a message indicating a change of Internet protocol (IP) address to a new IP address during the handover. For example, the UE (e.g., using the antenna 252, DEMOD/MOD 254, MIMO detector 256, receive processor 258, controller/processor 280, memory 282, and/or the like) may receive the message. At block 606, the user equipment (UE) releases resources associated with the first call, in response to receiving the message. For example, the UE (e.g., using controller/processor 280, memory 282, and/or the like) may release the resources. The UE may also locally store the first header information.

At block 608, the user equipment (UE) registers the new IP address with the target network. For example, the UE (e.g., using controller/processor 280, memory 282, and/or the like) may register the new IP address. At block 610, the user equipment (UE) initiates a second call with the first header information. For example, the UE (e.g., using controller/processor 280, memory 282, and/or the like) may initiate the second call.

At block 612, the user equipment (UE) replaces the first call with the second call and the new IP address. For example, the UE (e.g., using controller/processor 280, memory 282, and/or the like) may replace the first call. In some aspects, the UE may generate a user interface message indicating an attempt to reconnect the first call.

Figure 7:
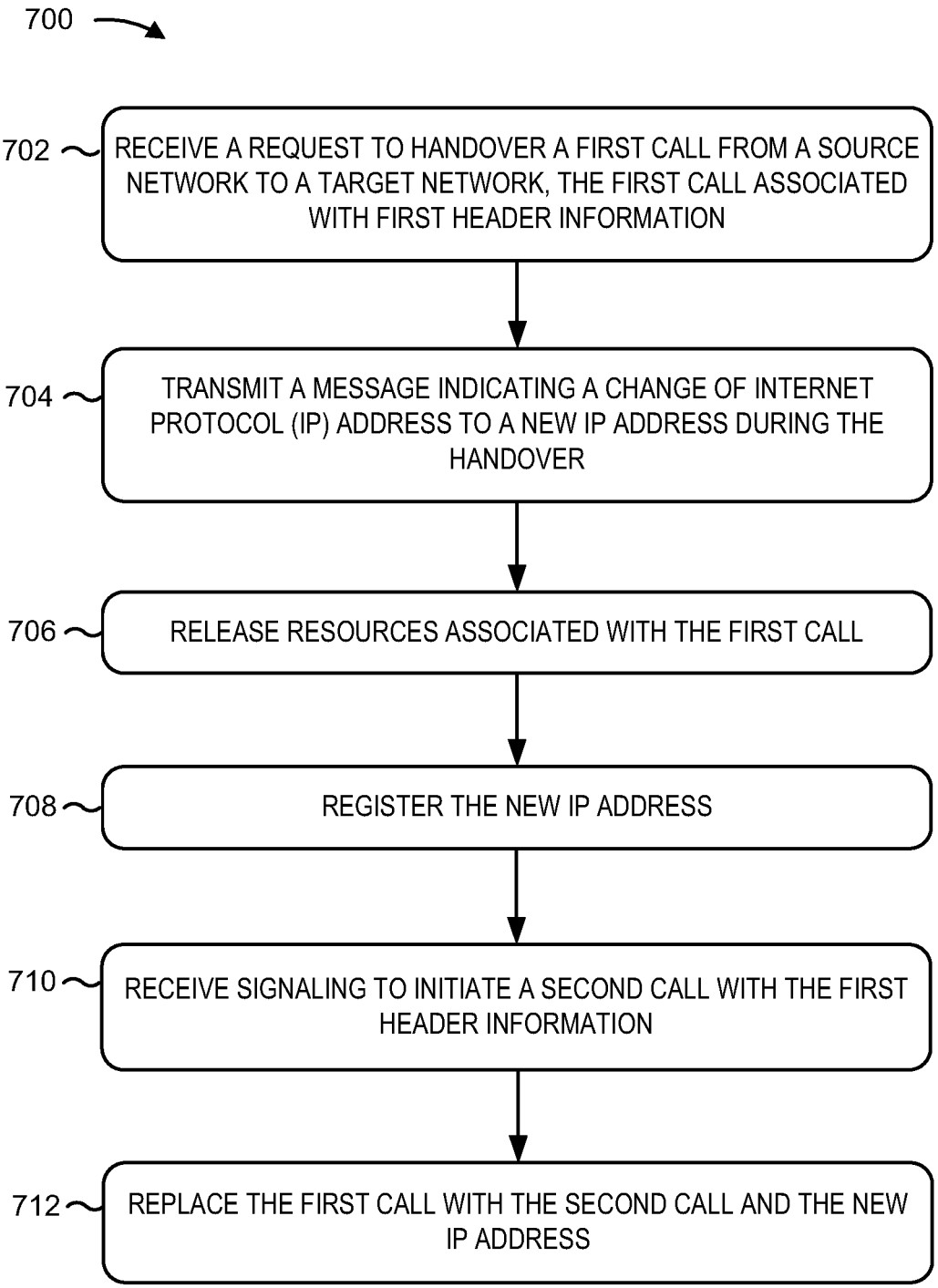
FIG. 7 is a flow diagram illustrating an example process performed, for example, by a network device, in accordance with various aspects of the present disclosure.

FIG. 7 is a flow diagram illustrating an example process 700 performed, for example, by a network device, in accordance with various aspects of the present disclosure. The example process 700 is an example of connected call recovery during handover from one wireless network to another. The operations of the process 600 may be implemented by a base station 110, a component of a base station, or some other network element, such as a WLAN network element.

At block 702, the base station receives a request to handover a first call from a source network to a target network. The first call is associated with first header information. For example, the base station (e.g., using the antenna 234, MOD/DEMOD 232, MIMO detector 236, receive processor 238, controller/processor 240, memory 242, and/or the like) may receive the request. The first header information may be a call identification (ID), information about a calling party, and information about a called party. In some aspects, the source network is a cellular network and the target network is a wireless local area network (WLAN). The cellular network may be a fifth generation (5G) new radio (NR) or a fourth generation (4G) long term evolution (LTE) network, for example.

At block 704, the base station transmits a message indicating a change of Internet protocol (IP) address to a new IP address during the handover. For example, the base station (e.g., using the antenna 234, MOD/DEMOD 232, TX MIMO processor 230, transmit processor 220, controller/processor 240, memory 242, and/or the like) may transmit the message. At block 706, the base station releases resources associated with the first call. For example, the base station (e.g., using the controller/processor 240, memory 242, and/or the like) may release the resources. At block 708, the base station registers the new IP address. For example, the base station (e.g., using the transmit processor 220, controller/processor 240, memory 242, and/or the like) may registers the new IP address.

At block 710, the base station receives signaling to initiate a second call with the first header information. For example, the base station (e.g., using the antenna 234, MOD/DEMOD 232, MIMO detector 236, receive processor 238, controller/processor 240, memory 242, and/or the like) may receive the signaling. At block 712, the base station replaces the first call with the second call and the new IP address. For example, the base station (e.g., using the controller/processor 240, memory 242, and/or the like) may replace the first call.

Example Aspects

Aspect 1: A method of wireless communication, comprising: initiating handover of a first call from a source network to a target network, the first call associated with first header information; receiving a message indicating a change of Internet protocol (IP) address to a new IP address during the handover; releasing resources associated with the first call, in response to receiving the message; registering the new IP address with the target network; initiating a second call with the first header information; and replacing the first call with the second call and the new IP address.

Aspect 2: The method of Aspect 1, in which the target network comprises an IP multimedia subsystem (IMS) network.

Aspect 3: The method of Aspect 1 or 2, in which the first header information comprises a call identification (ID), information about a calling party, and information about a called party.

Aspect 4: The method of any of the preceding Aspects, further comprising locally storing the first header information.

Aspect 5: The method of any of Aspects 1, 3, or 4, in which the source network comprises a cellular network and the target network comprises a wireless local area network (WLAN).

Aspect 6: The method of any of the preceding Aspects, in which the cellular network comprises a fifth generation (5G) new radio (NR) or a fourth generation (4G) long term evolution (LTE) network.

Aspect 7: The method of any of the preceding Aspects, further comprising generating a user interface message indicating an attempt to reconnect the first call.

Aspect 8: A method of wireless communication by a network entity, comprising: receiving a request to handover a first call from a source network to a target network, the first call associated with first header information; transmitting a message indicating a change of Internet protocol (IP) address to a new IP address during the handover; releasing resources associated with the first call; registering the new IP address; receiving signaling to initiate a second call with the first header information; and replacing the first call with the second call and the new IP address.

Aspect 9: The method of Aspect 8, in which the target network comprises an IP multimedia subsystem (IMS) network.

Aspect 10: The method of Aspect 8 or 9, in which the first header information comprises a call identification (ID), information about a calling party, and information about a called party.

Aspect 11: The method of any of the Aspects 8 or 10, in which the source network comprises a cellular network and the target network comprises a wireless local area network (WLAN).

Aspect 12: The method of any of the Aspects 8-11, in which the cellular network comprises a fifth generation (5G) new radio (NR) or a fourth generation (4G) long term evolution (LTE) network.

Aspect 13: An apparatus for wireless communication, comprising: a memory; and at least one processor coupled to the memory, the at least one processor configured: to initiate handover of a first call from a source network to a target network, the first call associated with first header information; to receive a message indicating a change of Internet protocol (IP) address to a new IP address during the handover; to release resources associated with the first call, in response to receiving the message; to register the new IP address with the target network; to initiate a second call with the first header information; and to replace the first call with the second call and the new IP address.

Aspect 14: The apparatus of Aspect 13, in which the target network comprises an IP multimedia subsystem (IMS) network.

Aspect 15: The apparatus of Aspect 13 or 14, in which the first header information comprises a call identification (ID), information about a calling party, and information about a called party.

Aspect 16: The apparatus of any of the Aspects 13-15, in which the at least one processor is further configured to locally store the first header information.

Aspect 17: The apparatus of any of the Aspects 13, 15, or 16, in which the source network comprises a cellular network and the target network comprises a wireless local area network (WLAN).

Aspect 18: The apparatus of any of the Aspects 13-17, in which the cellular network comprises a fifth generation (5G) new radio (NR) or a fourth generation (4G) long term evolution (LTE) network.

Aspect 19: The apparatus of any of the Aspects 13-18, in which the at least one processor is further configured to generate a user interface message indicating an attempt to reconnect the first call.

Aspect 20: An apparatus for wireless communication by a network entity, comprising: a memory; and at least one processor coupled to the memory, the at least one processor configured: to receive a request to handover a first call from a source network to a target network, the first call associated with first header information; to transmit a message indicating a change of Internet protocol (IP) address to a new IP address during the handover; to release resources associated with the first call; to register the new IP address; to receive signaling to initiate a second call with the first header information; and to replace the first call with the second call and the new IP address.

Aspect 21: The apparatus of Aspect 20, in which the target network comprises an IP multimedia subsystem (IMS) network.

Aspect 22: The apparatus of Aspect or 21, in which the first header information comprises a call identification (ID), information about a calling party, and information about a called party.

Aspect 23: The apparatus of any of the Aspects 20 or 22, in which the source network comprises a cellular network and the target network comprises a wireless local area network (WLAN).

Aspect 24: The apparatus of any of the Aspects 20-23, in which the cellular network comprises a fifth generation (5G) new radio (NR) or a fourth generation (4G) long term evolution (LTE) network.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   initiating handover of a first call from a source network to a target network, the first call associated with first header information;
   receiving a message indicating a change of Internet protocol (IP) address to a new IP address during the handover;
   releasing resources associated with the first call, in response to receiving the message;
   registering the new IP address with the target network;
   initiating a second call with the first header information; and
   replacing the first call with the second call and the new IP address.

2. The method of claim 1, in which the target network comprises an IP multimedia subsystem (IMS) network.

3. The method of claim 1, in which the first header information comprises a call identification (ID), information about a calling party, and information about a called party.

4. The method of claim 1, further comprising locally storing the first header information.

5. The method of claim 1, in which the source network comprises a cellular network and the target network comprises a wireless local area network (WLAN).

6. The method of claim 5, in which the cellular network comprises a fifth generation (5G) new radio (NR) or a fourth generation (4G) long term evolution (LTE) network.

7. The method of claim 1, further comprising generating a user interface message indicating an attempt to reconnect the first call.

8. A method of wireless communication performed by a network entity, comprising:
- receiving, from a user equipment (UE), a request to handover a first call from a source network to a target network, the first call associated with first header information;
- transmitting a message indicating a change of Internet protocol (IP) address to a new IP address during the handover;
- releasing resources associated with the first call;
- registering the new IP address;
- receiving signaling to initiate a second call with the first header information; and
- replacing the first call with the second call and the new IP address.

9. The method of claim 8, in which the target network comprises an IP multimedia subsystem (IMS) network.

10. The method of claim 8, in which the first header information comprises a call identification (ID), information about a calling party, and information about a called party.

11. The method of claim 8, in which the source network comprises a cellular network and the target network comprises a wireless local area network (WLAN).

12. The method of claim 11, in which the cellular network comprises a fifth generation (5G) new radio (NR) or a fourth generation (4G) long term evolution (LTE) network.

13. An apparatus for wireless communication, comprising:
- a memory; and
- at least one processor coupled to the memory, the at least one processor configured to:
  - initiate handover of a first call from a source network to a target network, the first call associated with first header information;
  - receive a message indicating a change of Internet protocol (IP) address to a new IP address during the handover;
  - release resources associated with the first call, in response to receiving the message;
  - register the new IP address with the target network;
  - initiate a second call with the first header information; and
  - replace the first call with the second call and the new IP address.

14. The apparatus of claim 13, in which the target network comprises an IP multimedia subsystem (IMS) network.

15. The apparatus of claim 13, in which the first header information comprises a call identification (ID), information about a calling party, and information about a called party.

16. The apparatus of claim 13, in which the at least one processor is further configured to locally store the first header information.

17. The apparatus of claim 13, in which the source network comprises a cellular network and the target network comprises a wireless local area network (WLAN).

18. The apparatus of claim 17, in which the cellular network comprises a fifth generation (5G) new radio (NR) or a fourth generation (4G) long term evolution (LTE) network.

19. The apparatus of claim 13, in which the at least one processor is further configured to generate a user interface message indicating an attempt to reconnect the first call.

20. An apparatus for wireless communication performed by a network entity, comprising:
- a memory; and
- at least one processor coupled to the memory, the at least one processor configured to:
  - receive, from a user equipment (UE), a request to handover a first call from a source network to a target network, the first call associated with first header information;
  - transmit a message indicating a change of Internet protocol (IP) address to a new IP address during the handover;
  - release resources associated with the first call;
  - register the new IP address;
  - receive signaling to initiate a second call with the first header information; and
  - replace the first call with the second call and the new IP address.

21. The apparatus of claim 20, in which the target network comprises an IP multimedia subsystem (IMS) network.

22. The apparatus of claim 20, in which the first header information comprises a call identification (ID), information about a calling party, and information about a called party.

23. The apparatus of claim 20, in which the source network comprises a cellular network and the target network comprises a wireless local area network (WLAN).

24. The apparatus of claim 23, in which the cellular network comprises a fifth generation (5G) new radio (NR) or a fourth generation (4G) long term evolution (LTE) network.

* * * * *